United States Patent [19]

Weinstein

[11] 3,731,060

[45] May 1, 1973

[54] DOCUMENT STORAGE AND RETRIEVAL SYSTEM

[75] Inventor: Hillel Weinstein, Haifa, Israel

[73] Assignee: Xerox Corporation, Stamford, Conn.

[22] Filed: Aug. 17, 1971

[21] Appl. No.: 172,496

[52] U.S. Cl....235/61.7 R, 235/61.11 E, 340/173 LT, 209/80.5

[51] Int. Cl. .....G06k 7/10, G11b 25/04, B01d 23/24

[58] Field of Search.................235/61.11 R, 61.11 E, 235/61.11 D, 61.7 R; 340/173 LT, 174.1 C; 209/80.5, 110.5; 250/219 D

[56] References Cited

UNITED STATES PATENTS

| | | | |
|---|---|---|---|
| 3,460,120 | 8/1959 | Lichowsky | 340/174.1 C |
| 3,339,993 | 9/1967 | Stoddard | 340/174.1 C |

*Primary Examiner*—Daryl W. Cook
*Attorney*—James J. Ralabate et al.

[57] ABSTRACT

A document storage and retrieval system is disclosed in accordance with the teachings of the present invention wherein a plurality of documents are arranged in rotating drum configuration such that each said document rotates through an optical scanning station. The optical scanning station includes optical scanning means for scanning an identifying optical code pattern recorded on a document when said document rotates into a predetermined position. An electrical representation of the scanned optical code pattern is compared with a predetermined electrical signal representative of a selected one of said document or group of said documents, and if said electrical representation corresponds to said predetermined electrical signal the scanned document is removed from said drum configuration. The document storage and retrieval system has the capability of retrieving a single stored document or a group of stored documents. In one embodiment of the present invention, the scanning station operates in a cooperating manner with reciprocating support means adapted to be interposed in the rotational path of the documents whereby a document that is rotated into said predetermined position is displaced from the drum configuration and supported by said reciprocating support means such that the optical code pattern on said document is optimally positioned at said scanning station. In another embodiment of the present invention the scanning station includes deflecting means fixedly disposed in said rotational path and adapted for slidable contact with said documents whereby the document that is rotated into said predetermined position is deformed to enable the successive scanning of the optical code patterns on each document.

18 Claims, 6 Drawing Figures

INVENTOR.
Hillel Weinstein
BY
Marn & Jangarathis
ATTORNEYS

INVENTOR.
Hillel Weinstein

BY
Marn & Jangarathis
ATTORNEYS

INVENTOR.
Hillel Weinstein
BY
Marn & Jangarathis
ATTORNEYS

DOCUMENT STORAGE AND RETRIEVAL SYSTEM

This invention relates to a document storage and retrieval system and more particularly to apparatus for selecting one or more of a plurality of continuously rotating documents.

Useful information may be recorded on documents and stored for an indefinite period of time. Such documents may include data storage cards, wherein data is recorded in the form of coded patterns such as sense markings, punched codes or the like. Other documents may include copy wherein graphical data such as microfiche or the like is recorded thereon. A principle requirement of each document storage system is ready access to the information recorded on each document.

The foregoing requirement is satisfied by prior art document storage and retrieval systems that employ serial retrieval of each document. These systems require the transfer of the stored documents from the storing station to a reading station wherein the information recorded on each said document is read. An obvious disadvantage inherent in this retrieval system is the length of time required to transfer each document and to read the stored information on each document. An improvement of such prior art systems provides for the selecting of a singular document in accordance with a document identifying code and the reading of the information recorded on said selected document. However, the delay in transferring each document from the storage station to a selecting station and the further delay in returning each of the unselected documents to the storage station is highly undesirable. In addition, the apparatus utilized by the prior art in storing and transferring the documents is expensive and complex, and is not easily adaptable for selecting a group of stored documents.

Therefore, it is an object of the present invention to provide a relatively inexpensive document storage and retrieval system.

It is another object of the present invention to provide a document storage and retrieval system for the rapid retrieval of one or more stored documents.

It is a further object of this invention to provide apparatus for selecting one of a plurality of continuously rotating documents or a group of such documents.

It is yet another object of the present invention to sequentially scan a plurality of stored documents without removing said documents from their stored configuration.

It is a still further object of this invention to identify and remove one or more of a plurality of randomly stored documents.

Various other objects and advantages of the invention will become clear from the following detailed description of exemplary embodiments thereof and the novel features will be particularly pointed out in connection with the appended claims.

In accordance with this invention, apparatus for selecting one of a plurality of documents or a group of documents is provided wherein said documents are arranged in rotating drum configuration such that each document rotates to a predetermined location whereat the document is displaced from the drum configuration to enable the optical sensing of a coded pattern recorded on and representing the identity of the displaced document; each sensed coded pattern is compared with a preselected pattern and those documents corresponding to said preselected pattern are removed from the drum configuration. An alternative embodiment provides for scanning means to be interposed in the rotational path of said documents at said predetermined location whereby the coded pattern of each document is scanned as said document advances past the scanning means.

The invention will be more clearly understood by reference to the following detailed description of exemplary embodiments thereof in conjunction with the accompanying drawings in which.

Figure 1:
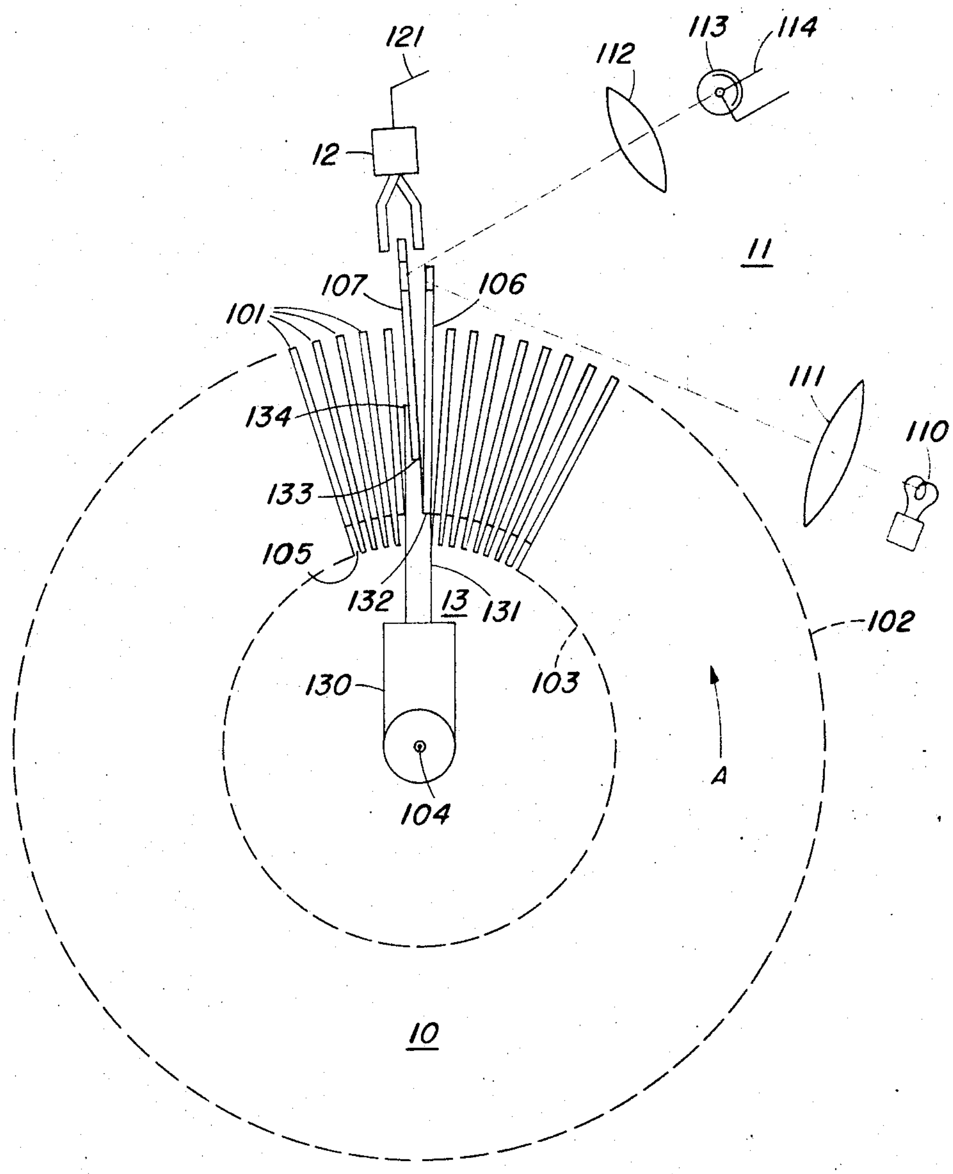
FIG. 1 illustrates the mechanical components of a typical embodiment of the present invention.

Referring now to the drawings wherein like reference numerals are used throughout, and in particular to FIG. 1, there is illustrated a diagram of a document storage and retrieval system in accordance with the present invention which comprises a plurality of documents 101 arranged in drum configuration 10, a sensing station 11, selecting means 12 and sensing enabling means 13. The individual documents 101 are disposed in the radial direction of a drum configuration 10 whereby the outer edge of each document 101 defines a first cylindrical plane having axis 104 and the inner edge of each document 101 defines a second concentric cylindrical plane having axis 104. The documents 101 are adapted to be continuously rotated in the direction indicated by the arrow A and accordingly, may be removably mounted in brackets 105. The brackets 105 should be sufficient to maintain the documents 101 in the drum configuration 10 throughout the 360° of rotation notwithstanding the gravitational and centrifugal forces exerted on documents 101. Accordingly, bracket means 105 may be disposed at opposite ends of documents 101 as will be seen from FIG. 2, and may cooperate to form a suitable frame for the drum configuration. If desired, support means other than the bracket means 105 may be provided to maintain documents 101 in a rotating drum configuration. Suitable driving means such as an electric motor, a gear train, a pulley system or the like (not shown) may be coupled to bracket means 105 to impart a rotational velocity to the drum configuration of documents 101.

The sensing station 11 is adapted to sense the coded pattern recorded on each document 101 when said document rotates into a predetermined location. The coded pattern distinctly represents the identity of the document 101 associated therewith and will be described in more detail with reference to FIG. 2. It is sufficient for an adequate understanding of FIG. 1 to note that sensing station 11 includes a source of light 110 such as a light emissive element, lens means 111 for projecting the light emitted by source of light 110 to a predetermined area via a first optical path, light sensitive means 113 for producing an electrical representation on lead 114 in accordance with the intensity of light transmitted thereto and lens means 112 to transmit light to light sensitive means 113 via a second optical path. It is seen from FIG. 1 that the first and second optical paths comprise intersecting optical paths, having a point of intersection at displaced document 107. Thus, it is seen that if document 107 has recorded thereon a coded pattern which is disposed at said point of intersection the intensity of the light transmitted along the second optical path is a function of said coded pattern.

Figures 2, 3, 4:
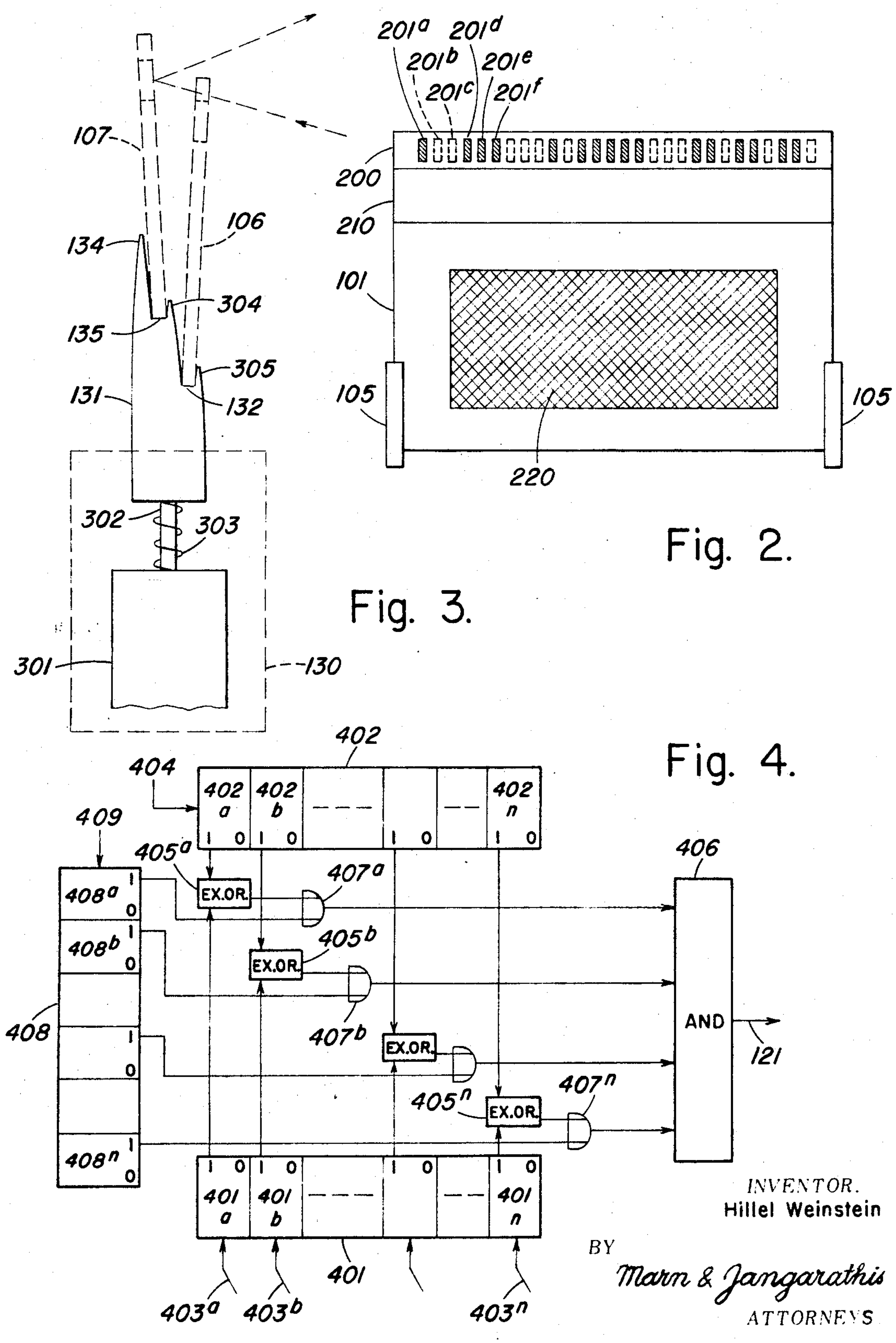
FIG. 2 is a representative diagram of a document stored by the apparatus of the present invention.
FIG. 3 is a detailed illustration of one of the mechanical components of the present invention.
FIG. 4 is a block diagram of the electrical apparatus of the present invention.

Before proceeding further with a description of FIG. 1, reference is now made to FIG. 2 which illustrates the typical configuration of a document 101. It is of course clearly understood that the documents 106 and 107 admit of a like configuration to that illustrated in FIG. 2. As shown, each document includes a first field 200 and a second field 220 recorded thereon. The field 220 comprises the information stored on document 101 and may for example comprise punch coded data or graphic information such as a microfiche or the like. The field 200 includes the coded pattern representing the identity of document 101. The identity of said document may relate to the information recorded in field 220 or to the relative position of the document 101 within the drum configuration of stored documents. FIG. 2 further illustrates that bracket means 105 are disposed in a spaced apart relationship corresponding to the lengthwise dimension of document 101 in order to provide an adequate support for said document. The longitudinal dimensions of bracket means 105 may assume any desired length.

The coded pattern of field 200 may comprise an optical pattern such as an array of sense markings 201 disposed longitudinally in field 200. The sense markings 201 are uniformly distributed such that the presence or absence of a sense marking at a particular location corresponds to a binary digit such as a "1" or a "0", respectively. Accordingly, the coded pattern comprised of sense markings 201 corresponds to a digital representation of the identity of document 101. Each sense marking 201 is adapted to modulate the intensity of light transmitted thereto and therefore comprises a darkened information area such as a rectangular strip, a dot or the like. If desired, each sense marking 201 may be an erasable pencil marking or the like to facilitate a change in the identity of document 101. Alternatively, the sense markings may comprise highly reflective strips of material.

Returning now to FIG. 1, it may be seen that the identity of the particular document 107 displaced from the drum configuration 10 may be ascertained by optically scanning the sense markings recorded thereon. Accordingly, the source of light 110 may comprise a single light emissive element adapted to emit a single beam of light. Lens means 111 serves to project a single beam of light to a predetermined area on the displaced document 107. It is of course understood that this predetermined area may correspond to field 200. The single beam of light may be displaced, such as by a movable mirror means, to sequentially scan each of the sense markings recorded on the document 107. Consequently, each scanned sense marking will modulate the intensity of the single beam of light transmitted thereto in an appropriate manner and the modulated light will be reflected to the light sensitive means 113. The light sensitive means 113 may comprise a single photodetecting means such as a photodiode, a phototransistor or the like, adapted to produce an electrical signal in response to the intensity of light reflected thereto. Lens means 112 serves to focus onto the photodetecting means 113 the modulated light reflected thereto from the sense markings on a document 107. Accordingly, a serial train of pulse signals is provided on lead 114 in accordance with the scanned sense markings on the document 107.

It should be clearly understood that if desired, the source of light 110 may effectively illuminate the entire field 200. Accordingly, the light sensitive means 113 preferably comprises an array of photodetecting means corresponding in number to the available sense marking positions 201*a* . . . 201*n* on field 200. If each photodetecting means is aligned with a corresponding sense marking position, it is understood that the array of photodetecting means will provide a parallel electrical representation of the optical pattern on field 200. An alternative embodiment of source of light 110 that may be utilized to scan the field 200 of the displaced document 107 comprises an array of light emissive elements corresponding in number to the available sense marking positions in field 200; each of said light emissive elements being aligned with a corresponding sense marking position.

It may be observed from the representative geometry of FIG. 1 that the optical devices comprising the optical sensing station 11 are not effective in and of themselves to detect the sense markings of the documents 101 that are arranged in the drum configuration 10. Accordingly, sensing enabling means 13 is provided to displace a document from the drum configuration 10 such that the field 200 of the displaced document receives the light projected thereto by the source of light 110 and lens means 111. The sensing enabling means 13 shown in FIG. 1, and in more detail in FIG. 3, comprises a support means adapted to be interposed in the rotational path of the documents 101 whereby a document is displaced from the drum configuration and supported by the support means. The support means may comprise a shaft 131 or the like with a shoulder 133 laterally disposed along the length of the shaft 131. The shaft 131 is further provided with a tapered end portion 134 to enable the shaft to be suitably interposed between adjacent documents. The shoulder 133 is capable of supporting a document thereon and may be provided with an upwardly extending lip portion 304, illustrated in FIG. 3, to provide a firm support for a document. The width of shoulder 133 may be approximately equal to the thickness of a document 101 and the lip portion 304 may assume a tapered configuration to ensure the support of only a single document by the shoulder 133. The shaft 131 is further adapted for reciprocating motion and is illustrated in FIGS. 1 and 3 in its extended position. When the shaft 131 assumes its retracted position it is removed from the rotational path of the documents 101 to enable said documents to rotate freely thereover. Accordingly, shaft 131 is mechanically coupled to an actuating means 130 which actuating means controls the reciprocating motion of the shaft.

The actuating means 130, illustrated in more detail in FIG. 3, may comprise a conventional solenoid means 301 including a plunger 302 and a biasing spring 303. The biasing spring 303 is effective to bias the shaft 131 in a downward direction toward solenoid 301. However the energization of solenoid means 301 is effective to extend the plunger 302 thereof in an upward direction to overcome the biasing force exerted by biasing spring 303 and to interpose the shaft 131 into the rotational path of the documents 101. The solenoid means 301 is energized by conventional means, not shown herein, in a timed relationship with the rotation of the documents 101. Thus as each document 101 is rotated into a position directly above the shoulder 133 of shaft 131, the solenoid means 301 is energized resulting in the displacement of the document. The interval of time required to optically scan the field 200 of the displace document is relatively small in comparison with the time required to angularly displace a document to an adjacent position. Accordingly, the energization of solenoid means 301 is rapidly terminated and biasing spring 303 serves to retract the shaft 131 so that the displaced document is returned to the drum configuration 10. Hence, the shaft 131 or solenoid means 301 may be fixedly secured so as to limit the angular displacement thereof as the documents 101 rotate. Although FIG. 1 illustrates that shaft 131 and the actuating means 130 are disposed interiorly and in a radial direction of the drum configuration 10, it should be understood that this illustration is merely exemplary. The sensing enabling means 13 may be disposed exteriorly of the drum configuration 10 and parallel to the axial direction thereof. Accordingly, when solenoid means 301 is energized to interpose the shaft 131 into the rotational path of documents 101, the particular document directly above the shoulder 133 will be displaced in a direction perpendicular to the plane of the paper of the drawing herein.

If the coded pattern of sense markings 201 recorded in field 200 of the displaced document represents the identity of a desired document, selecting means 12 is energized by further means via lead 121 described hereinbelow to remove the displaced document from the shoulder 133 of shaft 131. Accordingly, selecting means 12 may comprise solenoid operated gripping means adapted to seize the displaced document upon actuation thereof. Such gripping means are well known in the prior art, and need not be described further herein.

The foregoing has described one embodiment of the present invention in accordance with the apparatus illustrated herein. A modification of this apparatus admits of a second embodiment now described. Each document 101 illustrated in FIG. 2 may be provided with an additional field 210 which comprises a strip of highly reflective material. This strip, which may for example be a plated aluminum layer or any other material that is adapted to efficiently reflect light, is longitudinally disposed on the document 101 immediately adjacent the field 200. In addition, the sense markings 201 recorded on field 200 may comprise apertures or slits in the document through which light may be transmitted. One skilled in the art will recognize that the apertures at the sense marking positions positions on field 200 correspond to the aforementioned information areas. Accordingly, light that is transmitted to the field 200 will selectively pass therethrough in accordance with the coded optical pattern representing the identity of the document 101.

The purpose of the strip of light reflective material 210 will now be described in conjunction with a further modification of the apparatus of FIG. 1. Shaft 131 may include an additional shoulder 132 spaced from previously described shoulder 133 along the length of shaft 131. The purpose of the upwardly extending tapered lip portion 305 of shoulder 132 is similar to that of the lip portion 304 and therefore need not be described in detail herein. The shoulder 132 is adapted to support a document adjacent the document supported by shoulder 133 in the geometric configuration illustrated in FIGS. 1 and 3.

The operation of the apparatus of the present embodiment will now be described. As the documents 101 rotate about axis 14 in the counter clockwise direction indicated by the arrow A, actuation means 130 is energized in timed relation therewith. When a document such as document 107 assumes a position directly above the shoulder 133 of shaft 131 and when a document such as the document 106 assumes a position directly above the shoulder 132 of shaft 131, the actuating means 130 is energized to thereby interpose the shaft 131 into the rotational path of said documents. As the shaft 131 is urged in an upward direction, the shoulder 133 contacts the lower edge of document 107 to displace said document from the drum configuration. As the shaft 131 continues in its upward direction, the shoulder 132 contacts the lower edge of document 106 to displace this latter document from the drum configuration. When the shaft 131 obtains its extreme position the shoulders 132 and 133 effectively support the documents 106 and 107, respectively, as illustrated in FIGS. 1 and 3. Light emitted from the source of light 110 and projected to the field 200 of document 106 by lens means 111 selectively passes through the apertures 201 of field 200 in accordance with the coded pattern thereof. It is observed that whereas shoulder 133 admits of a higher elevation along the length of shaft 131 than the shoulder 132, the document 107 is supported such that the strip of light reflective material 210 thereof is aligned with the field 200 of document 106. Consequently, light that is selectively passed through the field 200 of document 106 via a first optical path is received by the light reflective material 210 of document 107 and reflected thereby to the light sensitive means 113 via a second optical path. If light sensitive means 113 is comprised of an array of photodetecting means, selected ones of said photodetecting means will be energized in accordance with the coded optical pattern recorded on field 200 of the document 106. Consequently, the array of photodetecting means will provide an electrical representation of the identity of the documents 106. If the document 106 is to be selected, selecting means 12 will be energized when actuating means 130 is next actuated. It is of course understood that at the time of energizing selecting means 12, the document 106 will assume the position now occupied by document 107.

When actuating means 130 is de-energized, the shaft 130 is retracted in accordance with the force exerted thereon by biasing spring 303. The lip portions 304 and 305 of the shoulders 133 and 132, respectively, cooperate with shaft 131 to exert restraining forces on the documents 107 and 106. Consequently, the retraction of the shaft 131 returns the documents 107 and 106 to the drum configuration. If desired the force exerted on documents 106 and 107 by gravity may be utilized to return said documents to the drum configuration when shaft 131 is retracted. The sensing enabling means 13 is now prepared for subsequent actuation thereof whereby the document adjacent to document 106 will next be displaced from the drum configuration 10.

It should be obvious to one skilled in the art that if desired the shoulders 132 and 133 may be disposed on diametrically opposite sides along the length of shaft 131. In addition, shaft 131 need not comprise a shaft but may assume any configuration whereby the documents 106 and 107 may be displaced from the drum configuration 10 upon rotation to the appropriate location. Further, it is understood that if conventional light reflecting means is fixedly disposed in the area now occupied by the strip of light reflective material 210 of document 107, the shaft 131 need displace only the single document 106 thereby obviating the requirement of shoulder 133. In that case, the fixedly disposed light reflecting means would reflect the light that is selectively transmitted through the apertures 201 of field 200 of document 106 to photodetecting means 113. Additionally, light sensitive means 113 may be in direct optical communication with the source of light 110 thereby defining a single optical path that is intercepted by the field 200 of document 106. Furthermore, although actuating means 130 has been heretofore described as a solenoid means, it is recognized that cam means adapted to rotate in synchronism with the documents 101 may be utilized to impart the aforedescribed reciprocating motion to shaft 131.

It is recalled that selecting means 12 is energized via lead 121 when the optical sensing station 11 senses a properly coded pattern. FIG. 4 is an electrical block diagram of the apparatus that may be employed to energize selecting means 12 and comprises comparison means adapted to compare the electrical representations provided on lead 114 with a predetermined digital signal. The comparison means comprises a first storage register 401 including a plurality of individual stages **401*a* . . . 401*n*, a second storage register 402 including a plurality of individual stages 402*a* . . . 402*n*, detecting means 405, coincidence means 406 and group selecting register 408 including a plurality of individual stages 408*a* . . . 408*n*. The first storage register 401 may comprise a conventional buffer register wherein each stage thereof is comprised of a flip-flop circuit. The storage register 401 is adapted to store in parallel relation the electrical representations of the coded identity pattern sensed by sensing station 11. It is understood that the electrical representations will be a digital signal comprised of a series 1's and 0's depending upon the presence or absence of a sense marking 201*a* . . . 201*n*. If the digital signal is to be applied to the stages of storage register 401 in parallel, the input terminals 403*a* . . . 403*n* of the individual stages of 401*a* . . . 401*n* are coupled to the associated leads 114 of the array of photodetecting means comprising light sensitive means 113. If however the digital signal is to be serially stored by the storage register 401, then storage register 401 may comprise a conventional shift register having an input terminal coupled to the lead 114 of the single photodetecting means comprising light sensitive means 113. Since each stage of storage register 401 may comprise a flip-flop circuit, it is understood that each said stage is provided with a pair of complementary output terminals hereinafter referred to as 1 and 0 terminals. Thus, if a stage of storage register 401 stores a binary "1", the 1 terminal thereof will be provided with an output signal. Conversely, if a stage of storage register 401 stores a binary "0", the 0** terminal thereof will be provided with an output signal.

The storage register 402 is similar to just described storage register 401 and is adapted to store a digital signal applied thereto in parallel or serial form. An input terminal 404 of storage register 402 is illustrated in FIG. 4 to enable the storage register 402 to store a serially applied digital signal. However, it is understood that an input terminal may be provided at each stage **402*a* . . . 402*n* of storage register 402 to enable the storage register 402 to store a digital signal applied thereto in parallel. The digital signal stored by storage register 402 is adapted to be a selectively determinable signal representative of the identity of a particular document. Accordingly, said digital signal may be supplied by operator controlled keyboard means or the like. It will be described below that the digital signal stored by storage register 402** may be representative of the identity of a group of documents.

Detecting means 405 is comprised of a plurality of gating means **405*a* . . . 405*n* each of which is adapted to compare the contents of a stage of storage register 401 with the contents of a corresponding stage of storage register 402. If the contents of the corresponding stages of storage registers 401 and 402 admit of a correlating relationship the particular gate associated therewith will provide an output signal. Accordingly, each of gates 405*a* . . . 405*n* may comprise exclusive OR circuit means. Each exclusive OR circuit means is provided with two input terminals and an output terminal. A first of said input terminals is coupled to a 1 terminal of an associated stage of storage register 401 and a second of said input terminals is coupled to a 1 terminal of an associated stage of storage register 402. Accordingly, exclusive OR circuit means 405*a* is coupled to stage 401*a* and 402*a*. Similarly, exclusive OR circuit means 405*b* is coupled to stage 401*b* and stage 402*b*. The remaining exclusive OR circuit means are similarly coupled. One skilled in the art will understand that a conventional exclusive OR circuit means will provide an output signal if and only if the two input signals supplied thereto are different. The inverse of this relationship may be obtained if the exclusive OR circuit means is provided with an inverting output terminal. Thus, an exclusive OR circuit means may be adapted to provide a binary "1" at the output thereof if a 11 or a 00 are supplied to the inputs thereof. Conversely, an exclusive OR circuit means may be adapted to provide a binary "0" at the output thereof if a 10 are supplied to the inputs thereof. The exclusive OR circuit means 405*a* . . . 405*n* are adapted in the manner just described so that exclusive OR circuit means 405*a* provides an output binary "1" if the bit stored in stage 401*a* corresponds to the bit stored in stage 402*a*. Similarly, exclusive OR circuit means 405*b* provides an output binary "1" if the bit stored in stage 401***b* corresponds to the bit stored in stage 402*b*. And exclusive OR circuit means 405*n* provides an output binary "1" if the bit stored in stage 401*n* corresponds to the bit stored in stage 402*n*. The output terminal of each exclusive OR circuit means 405*a* . . . 405*n* is coupled to an input terminal of coincidence means 406 via a corresponding OR gate 407*a* . . . 407*n*. Coincidence means 406 is adapted to apply an output binary "1" to lead 121 when each input thereof is supplied with a binary "1". Accordingly, coincidence means 406 may comprise a conventional AND gate. Group selecting register 408 is similar to storage register 402 and includes a plurality of stages 408*a* . . . 408*n*. The group selecting register is adapted to store a digital signal applied thereto in serial form via input terminal 409. It is understood, however, that a parallel applied digital signal may be stored therein by providing an input terminal at each stage 408*a* . . . 408*n*. Group selecting register 408 serves to enable the selection of a group of stored documents in accordance with the binary 1's stored in the various stages thereof. The 1 terminal of each stage 408*a* . . . 408*n* is coupled to an OR gate 407*a* . . . 407*n*. It will be seen that group selecting register 408 provides an overriding function for detecting means 405 whereby the detecting means disregards a non-correlating relationship between the contents of corresponding stages of storage registers 401 and 402 if a binary "1" is stored in an associated stage of group selecting register 408. Consequently, each input of coincidence means 406 may be supplied with a binary "1" even if the digital signal stored by storage register 401 is not identical to the digital signal stored by storage register 402. Hence, a group of documents may be retrieved, notwithstanding that the identity of a single document is stored in storage register 402. The binary 1's stored by group selecting register 408 may be supplied thereto by operator controlled keyboard means in accordance with the particular group or groups of documents desired.

It should be recognized that the input terminals of each exclusive OR circuit means may be coupled to the 0 terminals of corresponding stages of storage register 401 and 402. In addition, the exclusive OR circuit means may be comprised of conventional gating means interconnected so as to perform an exclusive OR function as described. Further, the aforementioned inverting terminal may be omitted from each exclusive OR circuit means and coincidence means 406 may be replaced by a conventional NOR circuit. If desired, storage register 402 may be supplied with complementary signals to enable the exclusive OR circuit means to compare the complementary signals with the digital signals stored in storage register 401.

The operation of the electrical apparatus of FIG. 4 will now be described in conjunction with the mechanical apparatus illustrated in FIG. 1. It is recalled that as the documents 101 continuously rotate about axis 104, a reciprocating motion is imparted to shaft 131 whereby the shaft is interposed in the rotational path of the documents thereby displacing at least one document 106 from the drum configuration 10. An operator wishing to select a particular document from the drum configuration 10 causes a digital signal representing the identity of said particular document to be stored in storage register 402 by actuating a conventional keyboard device. Group selecting register 408 will not contain any binary 1's therein. When the document 106 is displaced into the optical path defined by the source of light 110 and lens means 111, the coded pattern recorded on the document 106 is scanned and a digital signal representative of said coded pattern is stored in storage register 401. If desired, the source of light 110 may be energized to emit a flash of light when the document 106 obtains the position indicated in FIG. 1. Alternatively, shutter means may be provided in the optical path whereby the coded pattern recorded on document 106 is illuminated for a brief interval of time. If the document 106 does not conform to the document represented by the digital signal stored in storage register 402, the bit stored in at least one stage of storage register 401 will differ from the bit stored in a corresponding stage of storage register 402. Accordingly, coincidence means 406 will not be provided with a binary "1" at each input thereof and therefore, said coincidence means will not produce an output binary "1" on lead 121. Shaft 131 will be retracted by the subsequent de-energization of actuating means 130 and document 106 will be returned to its appropriate position in the drum configuration 10. As the next adjacent document is rotated into position, actuating means 130 is again energized to interpose shaft 131 into the rotational path of the documents. The aforedescribed operation is repeated, and the digital signal now stored by storage register 401 represents the identity of the presently scanned document. If the contents of the storage register 401 corresponds to the contents of the storage register 402, each exclusive OR circuit means 405*a* . . . 405*n* supplies OR gates 407*a* . . . 407*n* with a binary "1" which, in turn, supply coincidence means 406 with a binary "1" whereby said coincidence means produces an output binary "1". The output binary "1" produced by coincidence means 406 is effective to activate selecting means 12 via lead 121 to mechanically withdraw the scanned document. It should be understood that if shaft 131 is provided with two spaced shoulders 132 and 133 along the length thereof such that two documents 106 and 107 are displaced from the drum configuration 10, the actuation of selecting means 12 by coincidence means 406 will be delayed a sufficient period of time to enable the scanned document 106 to assume the position occupied by document 107. This enables the document next adjacent to document 106 to be scanned and the strip of light reflective material on the document 106 to establish a reflecting optical path to light sensitive means 113. Thus energization of selecting means 12 is effective to seize the document that has assumed the position illustratively occupied by document 107 in FIG. 1 thereby preventing the return of the seized document to the drum configuration 10. When a subsequent document is to be selected, a subsequent digital signal is supplied to storage register 402.

Let it now be assumed that a group of documents, rather than a single document, is to be selected from the drum configuration 10. Let it be further assumed that the group is determined by the first *n*-3 binary digits of the coded pattern recorded on each document and the three least significant binary digits thereof are not utilized. One skilled in the art of binary notation will appreciate that the group will consist of eight documents. The operator may now actuate the keyboard device so that a binary "1" is entered into the three least significant stages of group selecting register 408. The identity of the group of documents to be selected is determined by the first $n$-3 bits which are stored in the first $n$-3 stages of storage register 402. The actual contents of the three least significant stages of storage register 402 do not affect the selecting operation. Hence, any arbitrary bits may be stored in the three least significant stages since these bits are in effect, disregarded. If the coded pattern recorded on a scanned document is such that the first $n$-3 binary digits thereof correspond to the identity of the desired group, then the first $n$-3 bits stored in storage register 401 will be identical to the first $n$-3 bits stored in storage register 402. Consequently, each of the first $n-3$ exclusive OR circuits will supply coincidence means 406 with a binary "1". It is appreciated that one or more of the three least significant exclusive OR circuits may produce a binary 0. However, the corresponding 3 least significant stages of group selecting register 408 will supply coincidence means 406 with the binary 1's stored therein via the 3 least significant OR gates. Thus, the coincidence means 406 will produce an output binary "1" to activate selecting means 12 via lead 121 whereby the scanned document will be mechanically withdrawn. The foregoing operation will be performed for each of the eight documents having a coded pattern wherein the first $n-3$ binary digits thereof correspond to the first $n-3$ bits stored in storage register 402.

One of ordinary skill in the art will now recognize that the number of documents included in each group to be selected is determined by the number of binary 1's stored in group selecting register 408. In addition, the particular stages wherein the binary 1's are stored in group selecting register 408 determine which binary digits included in the coded pattern recorded on each document are to be disregarded during the comparison operation. Hence, the identity of each group of documents to be selected is a function of the contents of the group selecting register 408.

Figure 5:
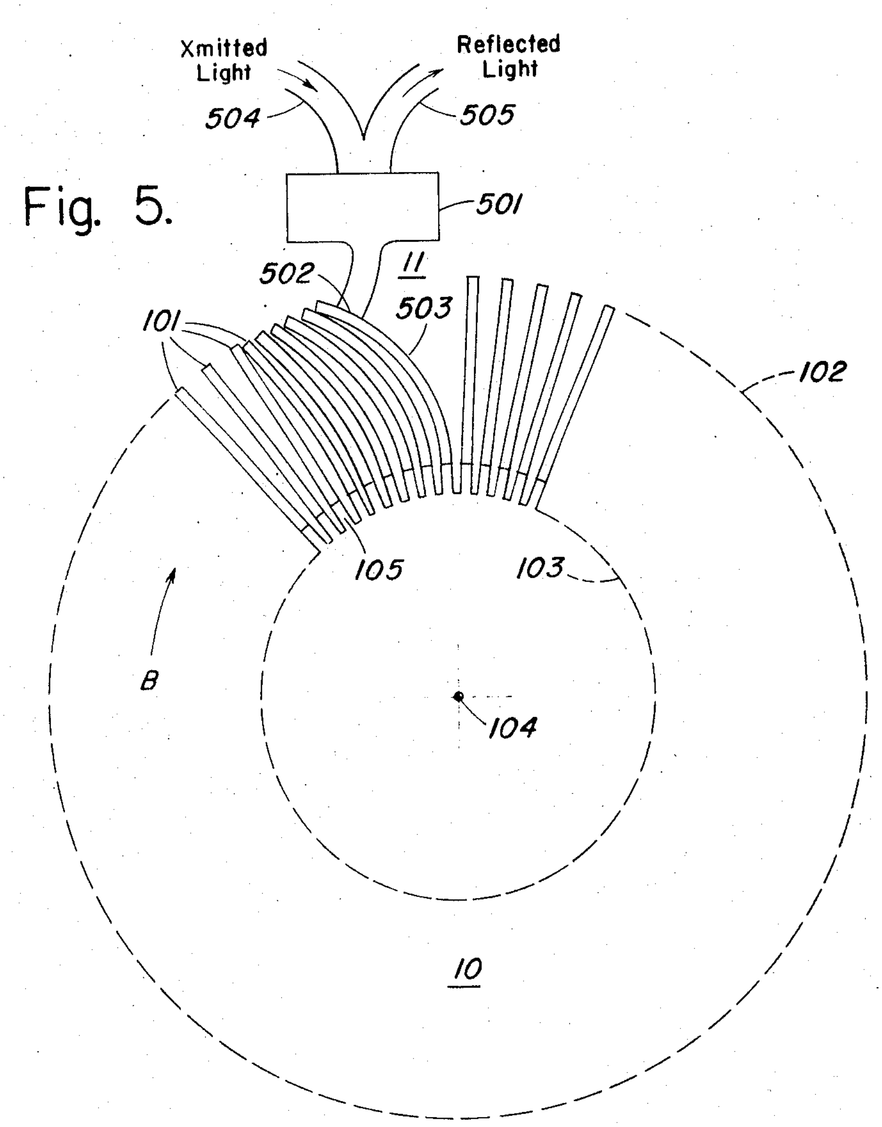
FIG. 5 illustrates the mechanical portion of the present invention in accordance with another embodiment thereof.
Figure 6:
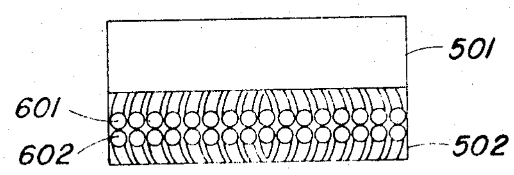
FIG. 6 is a diagrammatic representation of the scanning means of FIG. 5.

Referring now to FIG. 5 there is illustrated another embodiment of the sensing station 11 that may be employed with the electrical apparatus of FIG. 4. The sensing enabling means 13, previously described with respect to FIG. 1 comprises deflecting means 501 having an elongated portion thereof terminating at a surface 502 adapted for slidable contact with documents 101. The deflecting means 501 is fixedly disposed so that the elongated portion thereof is stationarily positioned in the rotational path of the documents 101. It is seen that the surface 502 is adapted to contact the upper portion of a document 503 which upper portion corresponds to the aforedescribed field 200. The elongated portion of deflecting means 501 includes light projecting means adapted to project light onto the sense markings 201 of the document 503 and light respective means adapted to receive modulated light transmitted thereto by the illuminated sensing markings 201. Accordingly, the light projecting means may comprise a plurality of light emitting elements similar to the source of light 110 of FIG. 1, and the light sensitive means may comprise a plurality of light sensitive means similar to aforedescribed light sensitive means 113. Alternatively, the light projecting means may comprise a plurality of optic fibers terminating at the surface 502 and adapted to be supplied with light transmitted thereto from a source of light via channel 504. The light receptive means may also comprise a plurality of optic fibers terminating at surface 502 and providing an optical path to light sensitive means via channel 505. FIG. 6 illustrates a typical array of such optic fiber means wherein optic fiber 601 is adapted to project light and optic fiber 602 is adapted to receive light. Accordingly, the optic fiber 601 may be aligned with the upper portion of sense marking **201*a* for example, and optic fiber 602 may be aligned with the lower portion of the sense marking 201*a*. It is understood that the optic fibers 601 and 602** may admit of a side by side relationship if so desired.

The operation of the apparatus of FIG. 5 is similar to that of the apparatus of FIG. 1 and need only be briefly described. The documents 101 continuously rotate in the direction indicated by the arrow B about the axis 104. When the surface 502 of the elongated portion of the deflecting means 501 slidably contacts the upper portion of a document such as document 503, the upper portion of document 503 is restrained from further rotation whereas the lower portion of document 503 continues to rotate. Accordingly, the document 503 is deformed as illustrated in FIG. 5. As the lower portion of document 503 continues to rotate the upper portion thereof is slidably removed from the surface 502 until the original geometry of said document is restored. Accordingly, the document next adjacent to document 503 is likewise deformed. When the surface 502 slidably contacts the upper portion of each document, the sense markings 201 are scanned by the optic fiber means 601 and 602. If the sense markings 201 are comprised of darkened information areas, the intensity of the light received by the receptive optic fiber means is modulated in accordance with said sense markings. Consequently, the electrical representations of the coded optical pattern on field 200 may be provided as has been described hereinabove.

One skilled in the art will recognize that an alternative embodiment of the apparatus of FIG. 5 may be provided wherein light projecting means and light receiving means may be disposed externally of the elongated portion of deflecting means 501. In this case the light projecting means may be similar to the source of light 110 and lens means 111 previously described and the light receiving means may be similar to lens means 112 and light sensitive means 113. A first optical path may be established between the light projecting means and the sense markings 201 of a deformed document and a second optical path may be established between the sense markings 201 of the deformed document and the light sensitive means. In addition, the sense markings 201 recorded on the document may comprise an array of rows and columns of sense markings. The optic fiber means included in the deflecting means 501 may comprise a corresponding array of rows and columns.

While the invention has been particularly shown and described with reference to a plurality of embodiments thereof, it will be obvious to those skilled in the art that the foregoing and various other changes and modifications in form and details may be made without departing from the spirit and scope of the invention. It is therefore intended that the appended claims be interpreted as including all such changes and modifications.

What is claimed is:

1. Apparatus for selecting one or more of a plurality of continuously rotating documents wherein said documents are arranged in drum configuration such that first and second edges of said documents define first and second concentric cylindrical planes having a common axis, comprising:

an optical sensing station or sensing optical patterns recorded on said documents and for providing distinct electrical representations of said optical patterns, each of said optical patterns identifying a particular one of said documents;

means for enabling said optical sensing station to successively sense the optical pattern recorded on each of said documents as each said document rotates to said sensing station;

comparison means coupled to said optical sensing station for comparing said electrical representations with a predetermined signal; and selecting means coupled to said comparison means for mechanically withdrawing a document from said drum configuration when the electrical representations of the optical pattern recorded on said document correspond to said predetermined signal.

2. The apparatus of claim 1 wherein said comparison means comprises:

first storage register means including a plurality of stages for storing digital signals comprising said predetermined signal;

second storage register means including a plurality of stages for storing digital signals comprising said electrical representations; and detecting means coupled to said first and second storage register means for detecting when a digital signal stored in said first storage register means corresponds to a digital signal stored in said second storage register means.

3. The apparatus of claim 2 wherein said comparison means further includes group selecting register means for storing digital signals identifying a group of documents to be selected and for determining the number of documents included in said group.

4. The apparatus of claim 3 wherein said detecting means comprises:

a plurality of gating means, each of said gating means including a first input coupled to an associated edge of said first storage register means and a second input coupled to an associated stage of said second storage register means whereby said gating means provides an output signal when the digital signals applied to said first and second inputs thereof admit of a correlating relationship; each of said gating means including a third input coupled to an associated stage of said group selecting register means whereby said gating means provides said output signal irrespective of said digital signals applied to said first and second inputs thereof when a predetermined digital signal is applied to said third input thereof; and coincidence means coupled to said selecting means for actuating said selecting means when each of said gating means provides an output signal.

5. The apparatus of claim 1 wherein said optical sensing station comprises:

light projecting means for projecting light to a predetermined area; and light sensitive means in optical communication with said predetermined area and responsive to the intensity of light transmitted to said light sensitive means from said predetermined area for providing said electrical representations.

6. The apparatus of claim 5 wherein said optical patterns comprise sense markings disposed longitudinally on said document to form an identifying code, said sense markings being adapted to modulate the intensity of light transmitted thereto.

7. The apparatus of claim 6 wherein said means for enabling comprises:

reciprocating support means disposed at a cooperating location with respect to said sensing station and adapted to be interposed in the rotational path of said documents upon the actuation thereof, whereby a document is displaced from said drum configuration and supported by said reciprocating support means such that the sense markings disposed longitudinally on said document are positioned in said predetermined area; and actuating means for actuating and de-actuating said reciprocating support means in timed relation with the rotation of said documents, whereby said reciprocating support means is removed from said rotational path upon the de-actuation thereof such that the displaced document is returned to said drum configuration.

8. The apparatus of claim 7 wherein said reciprocating support means comprises a shaft adapted for reciprocating movement along the longitudinal axis thereof; said shaft including a plurality of spaced shoulders along the length thereof such that individual documents are supported on said shoulders when said shaft is interposed in said rotational path, and including tapered portions adapted to be interposed between adjacent ones of said documents.

9. The apparatus of claim 8 wherein said sense markings comprise apertures through which light is transmitted and each of said documents further includes a strip of light reflective material disposed longitudinally on said document and adjacent to said apertures whereby the light projected by said projecting means is selectively transmitted through the apertures of a first document supported on a first shoulder of said shaft and reflected by the strip of reflective material on a second document supported on a second shoulder of said shaft to said light sensitive means.

10. The apparatus of claim 9 wherein said selecting means comprises gripping means adapted to seize a document supported on a shoulder of said shaft whereby said seized document is restrained from returning to said drum configuration.

11. The apparatus of claim 6 wherein said means for enabling comprises deflecting means fixedly disposed in the rotational path of said documents and including a surface adapted for slidable contact with said documents whereby a portion of a document in contact with said surface is restrained from rotating, thereby causing deformation of said document and exposing said sense markings to projected light.

12. The apparatus of claim 11 wherein said deflecting means includes:

first optic fiber means for providing a first optical path from said light projecting means to the sense markings of a deformed document; and second optic fiber means for providing a second optical path from said sense markings to said light sensitive means.

13. A document storage and retrieval system for selecting a document whose identity is represented by a punched code, comprising:

a plurality of rotating documents, said documents being arranged in drum configuration such that first and second edges of said documents define first and second concentric cylindrical planes having a common axis;

optical scanning means for scanning the punched code of each document when said document rotates into a predetermined position; said optical scanning means including:

light projecting means for projecting light along a first optical path;

light reflecting means optically coupled to said light projecting means via said first optical path for reflecting projected light;

light sensitive means optically coupled to said light reflecting means via a second optical path for providing electrical representations of the light reflected by said light reflecting means; and document displacing means for displacing documents from said drum configuration such that the punched code of a displaced document intercepts said first optical path whereby the light reflected by said light reflecting means is modulated in accordance with said punched code;

comparison means coupled to said light sensitive means for comparing said electrical representations with a predetermined electrical signal representative of a selected one or more of said rotating documents; and selecting means coupled to said comparison means for mechanically removing a displaced document when said electrical representations correspond to said predetermined electrical signal.

14. A document storage and retrieval system in accordance with claim 13 wherein said light reflecting means comprises a strip of light reflective material mounted on a document, said document bearing said strip of light reflective material being adjacent said displaced document.

15. A document storage and retrieval system in accordance with claim 14 wherein said document displacing means comprises:

shaft means adapted to be interposed in the rotational path of said documents upon the actuation thereof, said shaft means including at least two spaced shoulders along the length thereof such that adjacent documents are individually supported on said shoulders when said shaft means is interposed in said rotational path; and actuating means for successively actuating and de-actuating said shaft means in timed relation with the rotation of said documents, whereby said shaft means is removed from said rotational path upon the de-actuation thereof such that the displaced documents are returned to said drum configuration.

16. A document storage and retrieval system in accordance with claim 15 wherein said comparison means comprises:

first storage register means including a plurality of stages for storing digital signals comprising said predetermined electrical signal;

second storage register means including a plurality of stages for storing digital signals comprising said electrical representations;

group selecting register means for storing digital signals identifying a group of documents to be selected and for determining the number of documents included in said group;

a plurality of gating means, each of said gating means being coupled to corresponding stages of said first and second storage register means and to a corresponding stage of said group selecting register means for providing an indicating signal when the digital signals stored in said corresponding stages of said first and second storage register means admit of a correlating relationship, and for providing an indicating signal when a predetermined digital signal is stored in said corresponding stage of said group selecting register means irrespective of said digital signals stored in said corresponding stages of said first and second storage register means; and coincidence means responsive to said gating means for energizing said selecting means when each of said gating means provides an indicating signal.

17. A document storage and retrieval system for selecting a document whose identity is represented by coded sense markings, comprising:

a plurality of rotating documents, said documents being arranged in drum configuration such that first and second edges of said documents define first and second concentric cylindrical planes having a common axis;

optical scanning means for scanning the coded sense markings of each document when said document rotates into a predetermined position; said optical scanning means including:

deflecting means fixedly disposed in the rotational path of said documents and including a surface adapted for slidable contact with said documents for deforming each said document rotating into said predetermined position;

light projecting means for projecting light along a first optical path to the coded sense markings of a deformed document, said coded sense markings being adapted to modulate the intensity of light; and light sensitive means optically coupled to the coded sense markings of a deformed document via a second optical path for providing electrical representations of the intensity of light transmitted thereto from said coded sense markings;

comparison means coupled to said light sensitive means for comparing said electrical representations with a predetermined electrical signal representative of a selected one or more of said rotating documents; and selecting means coupled to said comparison means for mechanically removing a scanned document when said electrical representations correspond to said predetermined electrical signal.

18. A document storage and retrieval system in accordance with claim 17 wherein said light projecting means includes first optic fiber means coupled to a source of light and terminating at said surface; and said light sensitive means includes second optic fiber means coupled to photodetecting means and terminating at said surface.

* * * * *